US005778332A

United States Patent [19]

Chang et al.

[11] Patent Number: 5,778,332

[45] Date of Patent: Jul. 7, 1998

[54] ELECTRONIC NERVOUS SYSTEM FOR A ROADWAY AND METHOD

[75] Inventors: James Shih-Tsih Chang; James Jay Fanning, both of Colorado Springs, Colo.

[73] Assignee: J-Squared, LLC, Colorado Springs, Colo.

[21] Appl. No.: 560,462

[22] Filed: Nov. 17, 1995

[51] Int. Cl.$^6$ .......................... G06F 19/00; G06F 163/00

[52] U.S. Cl. .......................................... 701/117; 701/119

[58] Field of Search .................................. 364/436, 437, 364/438; 340/909, 910, 911; 701/117, 118, 119

[56] References Cited

U.S. PATENT DOCUMENTS

| | | | |
|---|---|---|---|
| Re. 31,044 | 9/1982 | McReynolds | 364/437 |
| 3,660,812 | 5/1972 | Inose et al. | 340/35 |
| 3,920,967 | 11/1975 | Martin et al. | 235/150.24 |
| 4,322,801 | 3/1982 | Williamson et al. | 364/436 |
| 5,257,194 | 10/1993 | Sakita | 364/436 |
| 5,357,436 | 10/1994 | Chiu | 364/436 |
| 5,528,234 | 6/1996 | Mani et al. | 340/933 |

OTHER PUBLICATIONS

Nicholas V. Findler and John Strapp; Journal of Transportation Engineering, "Distributed Approach to Optimized Control of Stree Traffic Signals", vol. 118, No. 1, Jan./Feb. 1992, pp. 98–108.

*Primary Examiner*—Michael Zanelli
*Attorney, Agent, or Firm*—Dale B. Halling

[57] ABSTRACT

An electronic nervous system (10) for a roadway (12), has a plurality of nodes (14). The plurality of nodes (14) parallel the roadway and are connected by an information link (20). A plurality of sensors (16) are coupled to the plurality of nodes (14) and the output of the sensors (16) are processed by the nodes to form symbolic patterns (18). The symbolic patterns (20) travel along the information link (20). By comparing symbolic patterns (18) the state of the roadway (12) can be determined. The state can include a metric that measures how well traffic is flowing as well as determines transit times between nodes. A plurality of traffic signals (34) are coupled to the nodes (14) and are adjusted based on the symbolic patterns (18). A subset of the plurality of nodes (14) are coupled to a node supervisor (36).

13 Claims, 6 Drawing Sheets

ELECTRONIC NERVOUS SYSTEM FOR A ROADWAY AND METHOD

FIELD OF THE INVENTION

The present invention relates generally to the field of traffic monitoring and control systems and more specifically to an electronic nervous system for a roadway and method of operation.

BACKGROUND OF THE INVENTION

A number of systems have been proposed for traffic control and monitoring. The oldest is based on placing traffic lights and traffic signs along freeways and at surface road intersection. The placement of the traffic controls is based on the traffic engineers historical knowledge of the traffic and topology of the freeway and intersection. These systems result in inefficient traffic flows. For example, without knowledge of actual traffic flow and condition, a traffic light at an intersection may be green when there are no cars on the through street, while cars are waiting on the cross street. In addition, if the lights are not synchronized to the actual traffic, cars may unnecessarily have to wait at every stop light.

Recognizing these problems, traffic engineers monitored actual traffic conditions. These actual traffic conditions were then used to design optimum traffic controls. These traffic controls were then used to program the actual traffic light cycles at particular intersections. Unfortunately, these systems were not able to adjust in real time to changing conditions due for instance by an accident or adverse weather.

New traffic control and monitoring systems were proposed in which sensors were added to monitor the traffic real time. These systems passed all the sensor information continuously to a central controller, which then optimized the traffic controls globally based on a set of rules. This results in a cost prohibitive system because of the large quantity of information that is required to be sent to and from the central controller. The information requirements of centralized traffic systems resulted in a communication system with the complexity of a small local phone company. Additionally, such a system must possess costly, dedicated, high bandwidth data links. The dedicated, high bandwidth data links are not easily expanded and are susceptible to single point failure.

Systems with sensors that process the sensory information locally have been proposed for the limited situation of intersection grids. An intersection grid has every intersection at right angles to each other and all intersections have standard stop lights. Signal timing information is passed on to adjacent signal controllers. In these systems, each of the traffic signal controllers uses a fixed set of rules to process the information and adjust its traffic signals. The fixed set of rules is developed based on assumptions about how the traffic will behave. These systems have limited utility due to the highly idealized assumptions. In addition, these systems do not inform the traffic engineer how traffic is behaving or if an event such as an accident has occurred.

Thus, what is needed is a system that informs a traffic controller how traffic is behaving on the roadway, without overloading the traffic controller with information. The system needs to be generally applicable to all roadways, not just intersection grids.

SUMMARY OF THE INVENTION

An electronic nervous system for a roadway that achieves these objectives and provides other advantages has a number of symbolic patterns that travel along an electronic information path. The electronic information path parallels the roadway. A processor is coupled to the electronic information path and determines a state of the roadway based on the symbolic patterns traveling along the electronic information path.

DETAILED DESCRIPTION OF THE DRAWINGS

In summary, the present invention provides an electronic nervous system, and method of operating the system, that maintains a continuous watch on the traffic conditions in the roadway and informs a traffic controller, on an event driven basis, of the state of the roadway, without overloading the traffic controller with routine traffic data. In addition, the electronic nervous system provides: a transit time between any two points along the roadway; a metric of the how the roadway is performing at a plurality of points along the roadway; an alert when the metric indicates an event that requires attention by a traffic controller; and the ability to monitor the roadway by monitoring the electronic nervous system.

The electronic nervous system for the roadway includes sensors that capture a variety of physical parameters and nodes that can process these local senosr outputs to derive a symbolic pattern that is an accurate representation of the actual traffic pattern in the roadway. The nodes are connected electronically by an electronic information path. The symbolic patterns travel along this electronic information path that parallels the roadway from node to node. Additionally, nodes along the electronic information path have processors that can determine the traffic condition of the roadway at the node based on the symbolic patterns.

Figure 1:
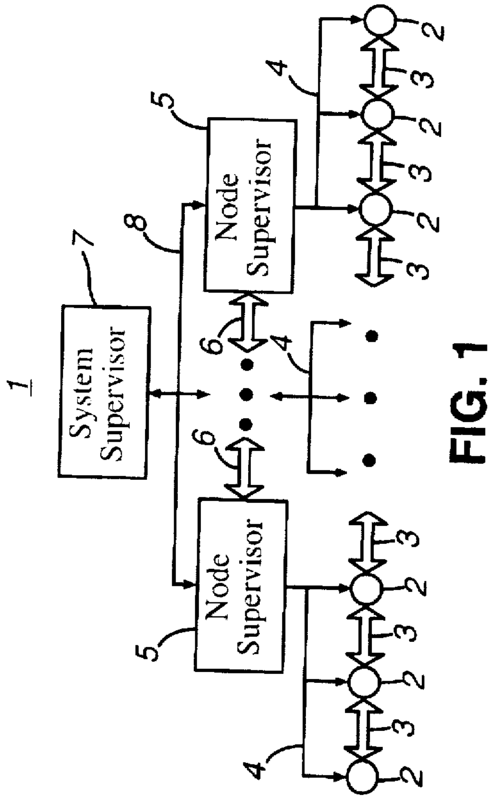
FIG. 1 is a block diagram of an embodiment of the electronic nervous system for a roadway.

The architecture of the electronic nervous system 1 for a roadway is shown in FIG. 1. A plurality of nodes 2 are placed parallel to the roadway. The nodes 2 generate symbolic patterns based on the traffic patterns occurring in the section of the roadway observed by the nodes 2. The nodes 2 pass the symbolic patterns to adjacent nodes 2 using a peer-to-peer information link 3. When an alert condition occurs one of the nodes 2 uses communication link 4 to inform a node supervisor 5. Each node supervisor 5 can further communicate on an as needed basis with adjacent node supervisors 5 using a non-dedicated communication link 6, such as an ordinary telephone line. When one of the node supervisors 5 determines a regional alert condition exists, it contacts the system supervisor 7 using also a non-dedicated communication link 8, such as telephone line. An important feature of the architecture is that it is an event driven system. This means that only alert conditions at the node 2 level are communicated to the node supervisors 5. The same is true of the node supervisor 5 level. Only alert conditions at the node supervisor 5 level are passed on to the system supervisor 7.

Figure 2:
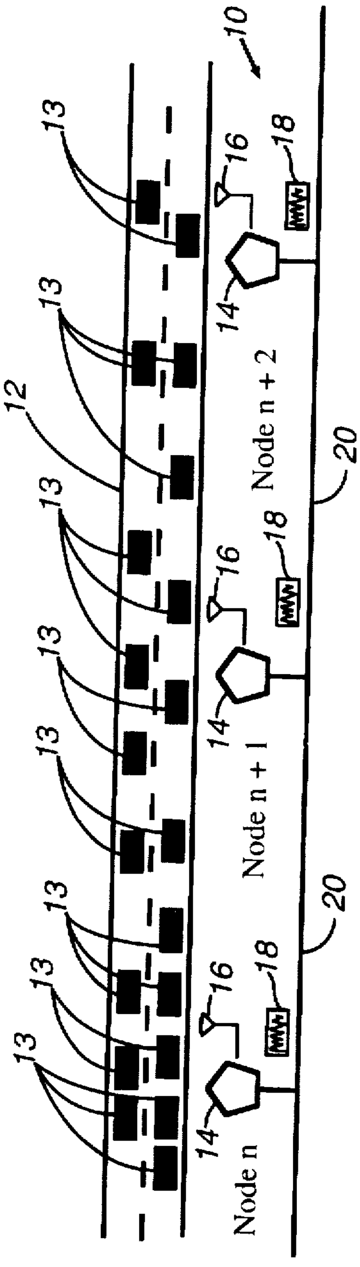
FIG. 2 is a schematic diagram of an electronic nervous system for a roadway.

FIG. 2 is a schematic diagram of an embodiment of an electronic nervous system 10 for a roadway 12. The roadway 12 is shown with a plurality of vehicles 13. The electronic nervous system 10 has a plurality of nodes 14 coupled to a plurality of sensors 16. A plurality of symbolic patterns 18 are derived from the output of the sensors 16. The symbolic patterns 18 include physical parameters and quantities derived from the physical parameters. The symbolic patterns 18 are transferred from each node to its adjacent nodes using a peer to peer information link 20. For instance, the symbolic pattern 18 derived from node n+1 would be transferred to adjacent node n+2. In this way the symbolic patterns 18 are passed along in a bucket brigade fashion. An advantage of the peer to peer communication link is that if one of the nodes is inoperable, it does not disrupt the peer to peer communication link 20. In addition, the system of FIG. 2 can be easily expanded by adding a node or removing a node from the peer to peer communication link 20.

The symbolic patterns 18 represent traffic conditions on the roadway 12 and can be composed of observables such as vehicle position, velocity, acceleration, vehicle separations, flow speed, flow density, occupancy, spatial frequency, queue lengths, platoon size, frequency of lane change, deceleration, time of day, season, weather conditions, visibility, vehicle classification, sun position, etc. In addition, the symbolic patterns can include derived quantities from these observables and historical patterns. The symbolic patterns contain all the essential information necessary to describe the traffic condition in the roadway. Just as the actual traffic patterns flow through the roadway, the symbolic patterns that represent the actual traffic patterns flow through the electronic nervous system. By monitoring the flow of symbolic patterns in the electronic nervous system, the system can derive the actual condition in the roadway. For example, by comparing a first symbolic pattern generated at a first node with a symbolic pattern generated at an upstream node the traffic condition of the roadway between the two nodes can be characterized. The state of the node can include a metric that measures how well traffic is flowing and a transit time.

Figure 3:
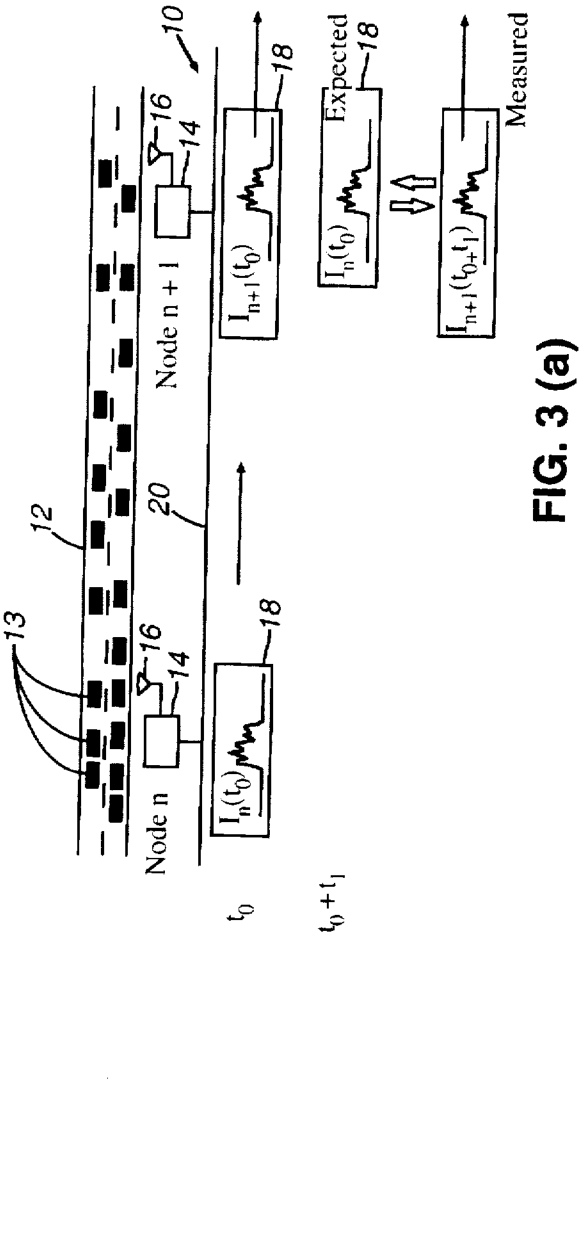
FIGS. 3(*a*) and 3(*b*) are schematic diagrams of a comparison process used by the electronic nervous system.
Figure 3:
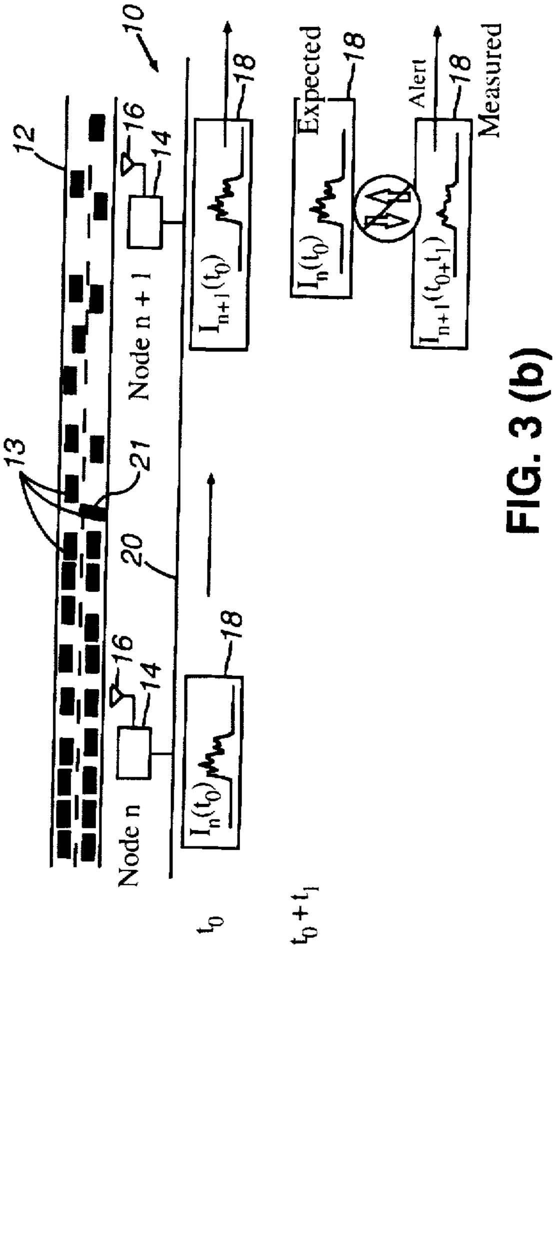

The metric is generated using the symbolic patterns 18 and allows the system to detect anomalies. This is illustrated in FIG. 3(*a*). Node n+1 receives at time to from node n the symbolic pattern 18 as monitored by node n at $t_0$ and stores this symbolic pattern 18. As the symbolic patterns can travel along the electronic nervous system at electronic speed, it can always arrive in advance of the actual traffic pattern. This advantage in time, which may be 15 seconds for nodes 0.25 miles apart and a roadway speed of 60 mph, is significant in providing a look ahead. This look ahead and advantage in time is sufficient for the system to exercise adeptive measures as required. A comparison for consistency of the passed symbolic pattern, at the time it is received at node n+1, with the local symbolic pattern at node n+1 gives a measure of how good the traffic flow is maintained in the roadway between nodes n and n+1. A high degree of correlation indicates the flow between the two nodes is unimpeded and traffic is moving well. A low correlation on the other hand indicates trouble with the flow. In particular, a sudden and fast change in correlation is always condition for alert. The goodness of fit between these two patterns give a metric for monitoring the performance of the system and traffic flow in the roadway. In this manner, by monitoring the flow of symbolic patterns in the electronic nervous system actually is equivalent to the direct monitoring of the roadway. As symbolic pattern passing is occurring simultaneousely everywhere in the electronic nervous system, the entire roadway network is under continuous surveillance. The comparison to determine the metric or the goodness of fit can be performed using several techniques including: correlation techniques, pattern matching, artificial neural network processing, fuzzy logic, expert system based processing, etc. If the passed symbolic pattern is the same as the local symbolic pattern, then the metric would be unity or one. Under normal roadway conditions, where vehicles in the roadway move relative to each other, the metric is always less than one. However, any significant deviation between the local pattern and the passed pattern, particularly if the change occurs in a short time, is condition for alert and results in a lower value for the metric. This situation is illustrated in FIG. 3(*b*), where a vehicle 21 has been involved in an accident and is blocking a lane of traffic. As a result the expected and measured symbolic patterns 18 differ significantly and this change occurred suddenly, an alert is sensed by node n+1.

The node n+1 of FIG. 3(*b*) having sensed an alert condition communicates to a node supervisor. Small deviations maybe corrected and optimized autonomically with local traffic control signals under the control of a group of neighboring nodes working together peer-to-peer. Here the metric is used directly to assess results of exerting traffic control to optimize flow. Operating in this manner, the system achieves an autonomic capability that addresses local traffic conditions with local processing in a closed control loop. Most significantly, in this autonomic mode no interaction with a centralized system supervisor is necessary unless an alert is activated.

In one embodiment the symbolic pattern includes the location or where it was generated, the time and date it was generated, the vehicle speeds, and vehicle spacings, during a defined sampling interval. By correlating this information from the upstream node with the measuring node when the traffic is expected to arrive at the present node a metric of traffic flow is obtained. Transit times can be derived from average vehicle speeds at each node or by looking for the peak correlation between the upstream symbolic pattern and the present symbolic pattern. Using these transit times it is possible to derive trip times for any two points where the electronic nervous system is installed. The trip times can be used to determine the fastest path between any two points, using real time information.

Figure 4:
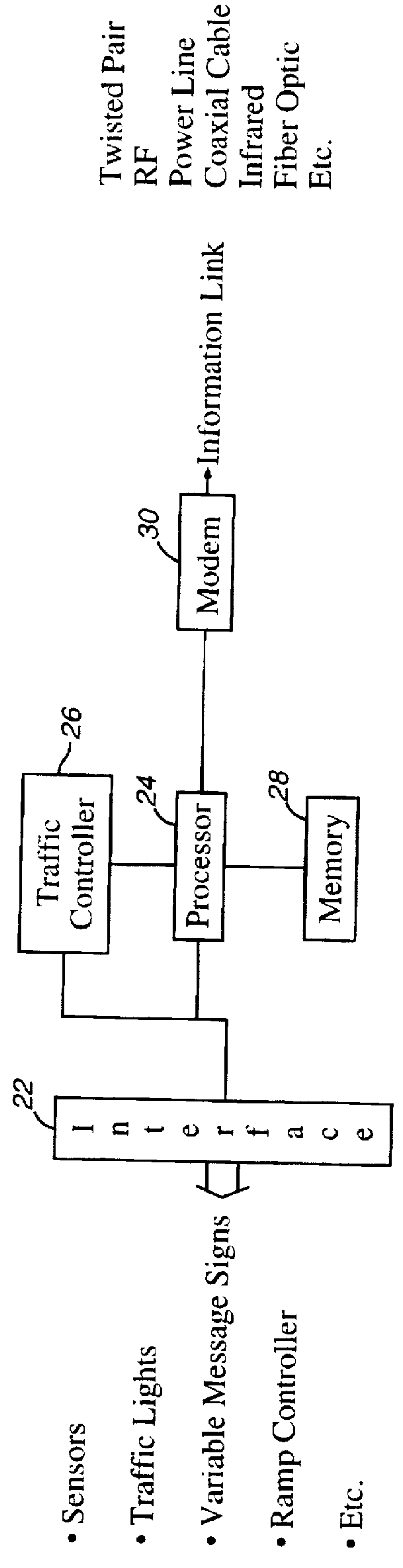
FIG. 4 is a block diagram of a node.

FIG. 4 is a block diagram of one of the nodes 14. The node 14 has an interface 22 that connects the node to traffic sensors and/or traffic signals. The sensors 16 could be a wide variety devices including in-ground loop sensors, infrared sensors, RF sensors, acoustic sensors, cooperative sensors, a combination of the above or other sensing devices. The interface 22 is coupled to a processor 24 that derives the symbolic patterns 18. A traffic controller 26 is also connected to the interface 22. The traffic controller 26 controls the traffic signals based on input from the processor 24. The processor 24 and traffic controller 26 can be contained in the same microprocessor or other computing engine. The processor 24 is coupled to a memory 28 and a modem 30. The modem 30 transmits and receives information from the information link 20. The information link can physically take the form of a twisted pair, radio frequency over free space, power line, coaxial cable, infrared, fiber optic, line-of-sight laser, or packet radio. The information link can be any type of networking scheme such as FDDI, ATM, ISDN, Token ring, Ethernet, RS-485, etc.

Figure 5:
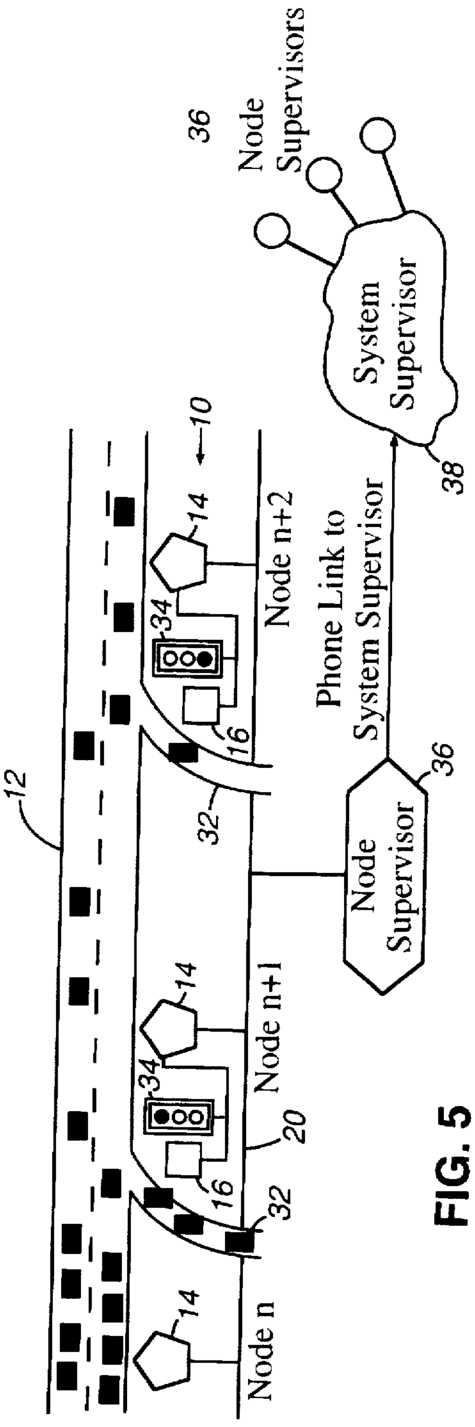
FIG. 5 is a schematic diagram of an embodiment of the electronic nervous system for a roadway.

FIG. 5 is another embodiment of the electronic nervous system 10 for the roadway 12. The roadway 12 is shown with a pair of on ramps 32. The nodes 14 are coupled to a plurality of traffic signals 34. This embodiment differs from FIG. 2 in that a node supervisor 36 is coupled to the information link 20. The node supervisor 36 is over a plurality of nodes 14 and monitors and resolves regional traffic issues when it receives an alert from one of the nodes 14. A plurality of node supervisors 36 is connected (e.g., a telephone line) to a system supervisor 38. The system supervisor 38 monitors and resolves system wide traffic issues. Unless a traffic issue is regional in scope the node supervisor 36 is uninvolved in control decisions at the nodes under its supervision. Unless a traffic issue is system wide in scope the system supervisor 38 is uninvolved in control decisions at the node supervisor 36 level.

Figure 6:
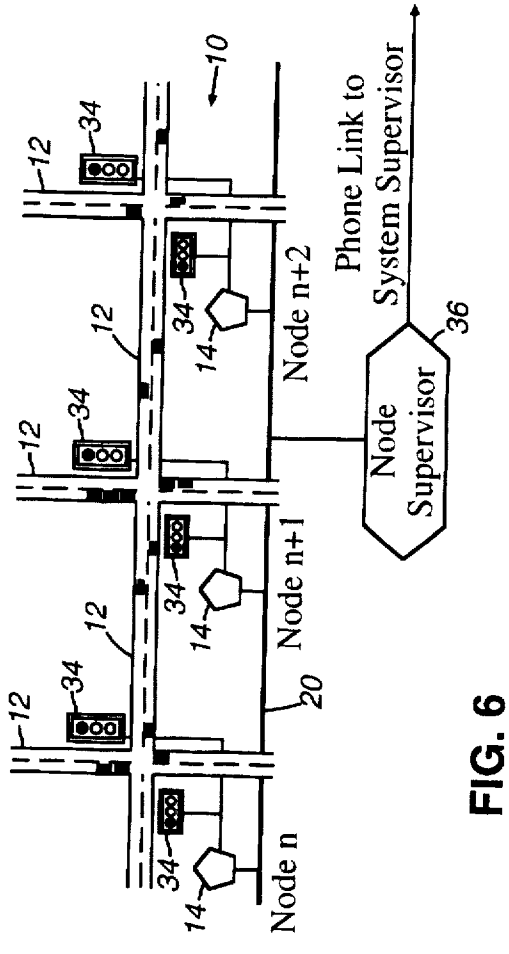
FIG. 6 is a schematic diagram of an embodiment of the electronic nervous system for a roadway.

FIG. 6 is another embodiment of the electronic nervous system 10 for the roadway 12. The system 10 is shown in conjunction with a city grid layout for the roadway. The system 10 contains the same elements as in the highway example shown in FIG. 5.

Figure 7:
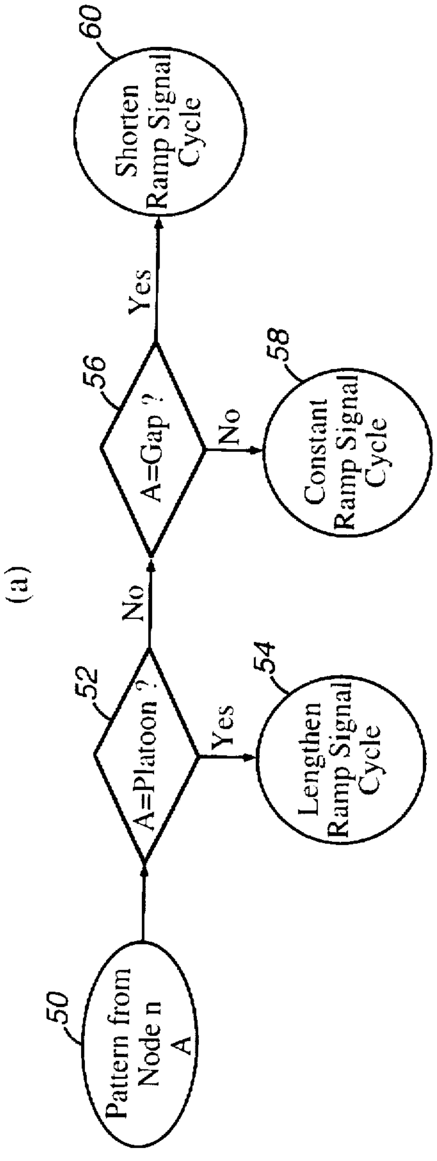
FIG. 7 is a flow diagram of decision process implemented by the system of FIG. 5.

FIG. 7 shows a flow diagram of how a traffic engineer might use the information gathered by the electronic nervous system 10 for the roadway 12 shown in FIG. 5. At step 50 the symbolic pattern "A" is determined at node n. Next, it is determined if the symbolic pattern "A" is representative of a platooning situation, at step 52. When "A" is representative of a platoon, the ramp signal cycle at node n+1 is lengthen (i.e., fewer cars are allowed onto roadway 12), at step 54. When "A" is not representative of a platoon, it is determine at step 56 if "A" is representative of a gap. When "A" is not representative of a gap, the ramp signal cycle is held constant, step 58. When "A" is representative of a gap, the ramp signal cycle at node n+1 is shortened (i.e., more cars are allowed onto roadway 12), at step 60.

Figure 8:
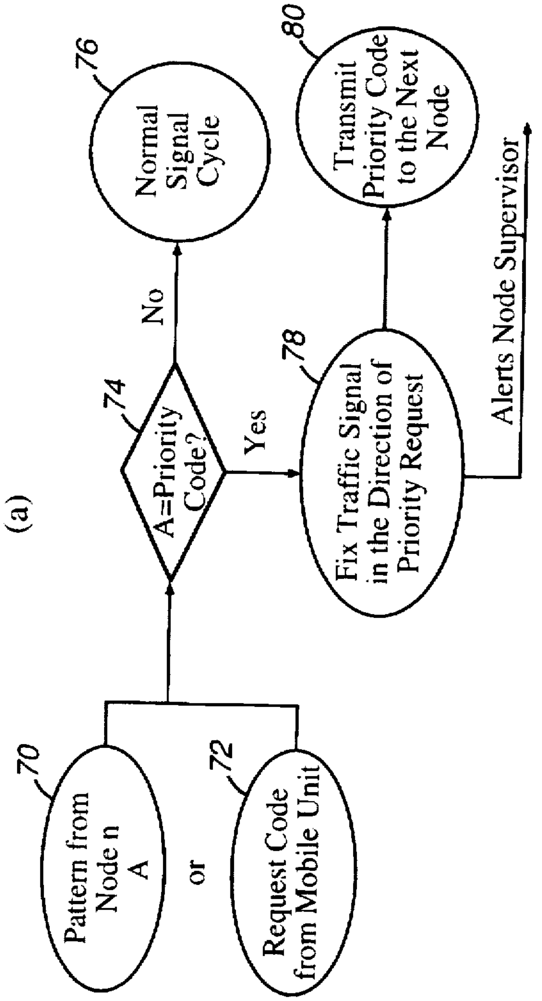
FIG. 8 is a flow diagram of decision process implemented by the system of FIG. 6.

FIG. 8 shows a flow diagram of how a traffic engineer might use the information gathered by the electronic nervous system 10 for the roadway 12 shown in FIG. 6. The process starts when either a pattern "A" is received from node n, step 70, or a request code is received from a mobile unit, step 72. A mobile unit could be ambulance that is requesting free passage to an accident. The ambulance is outfitted as a moving node in the electronic nervous system. The moving node can communicate with the electronic nervous system using an RF or infrared communications link. At step 74, it is determine if a priority code has been received. When a priority code has not been received, a normal signal cycle is maintained at step 76. When a priority code has been received, a fix traffic signal in the direction of a priority request is implemented, step 78, and the node supervisor is alerted to the situation. The priority code is then transmitted to the next node, step 80.

Figure 9:
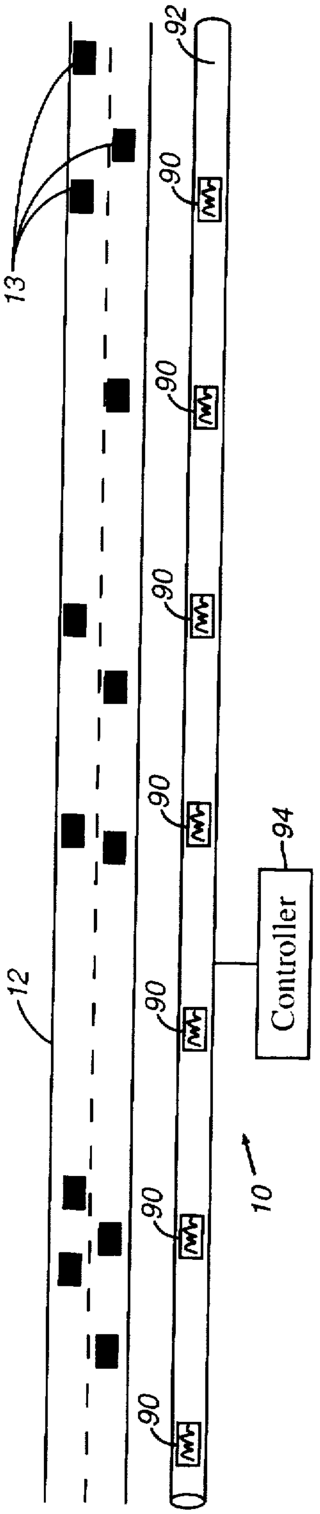
FIG. 9 is a schematic diagram of an embodiment of the electronic nervous system for a roadway.

FIG. 9 is an alternative embodiment of the electronic nervous system 10 for a roadway 12. The electronic nervous system 10 includes a plurality of symbolic patterns 90. The symbolic patterns 90 travel along an electronic information path 92 that parallels the roadway 12. A processor 94 is coupled to the electronic information path (roadway) 92 and determines the state of the roadway 12 based upon the symbolic patterns 90 traveling the electronic information path 92. The capability to monitor the roadway conditions by monitoring the electronic information path provides the traffic engineer with an extremely powerful tool. The traffic engineer using this tool can understand how traffic is performing anywhere along the roadway. In addition, the electronic information path can be used for real time predictive modeling. Since the symbolic patterns move at the speed of electricity, they can be advanced to see how traffic patterns will develop in the future.

Figure 10:
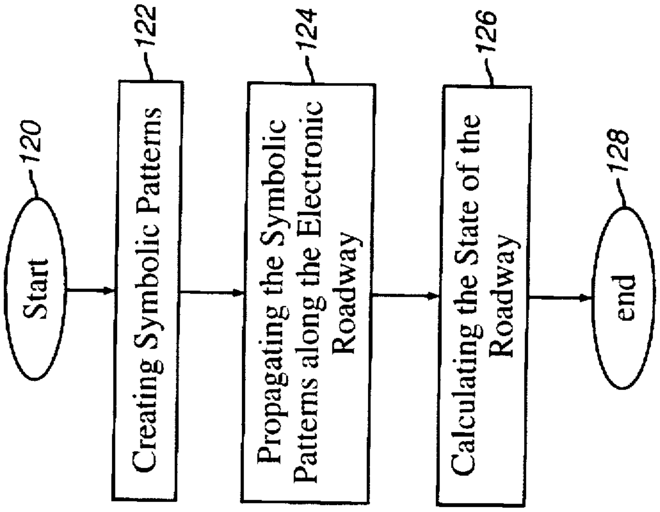
FIG. 10 is a flow chart of a process of operating an electronic nervous system for a roadway.

FIG. 10 is a flow chart of the steps for operating an electronic nervous system for a roadway. The process starts, block 120, by creating a plurality of symbolic patterns, at block 122. Next, the symbolic patterns are propagated along the electronic roadway, at block 124. From these symbolic patterns the state of the roadway is calculated at block 126. The process ends at block 128.

Thus there has been described an electronic nervous system for a roadway and a method of operation, that provides a metric of the performance of the roadway at every node. Using the invention transit times for any two points along the roadway can be calculated. A user can take advantage of this information to dynamically determine the fastest route to any destination. The system is an event driven autonomic system that significantly reduces the amount of information being passes between the lower levels of the architecture and the supervisory level. Finally, by monitoring the symbolic patterns on the electronic roadway the traffic engineer is monitoring the roadway conditions.

While the invention has been described in conjunction with specific embodiments thereof, it is evident that many alternatives, modifications, and variations will be apparent to those skilled in the art in light of the foregoing description. Accordingly, it is intended the invention embrace all such alternatives, modifications, and variations as fall within the spirit and broad scope of the appended claims.

What is claimed is:

1. An electronic nervous system for a roadway, comprising:

a plurality of symbolic patterns;

an electronic information path that parallels the roadway, the plurality of symbolic patterns traveling along the electronic information path; and a processor coupled to the electronic information path and deriving at least one of the plurality of symbolic patterns, the processor extracting at least one of the plurality of symbolic patterns from the electronic information path, the processor determining a state of the roadway by comparing two of the plurality of symbolic patterns.

2. The system of claim 1, further including a sensor.

3. The system of claim 2, wherein the plurality of symbolic patterns are generated based on an output of the sensor.

4. The system of claim 1, wherein the electronic information path is constructed in a computer.

5. The system of claim 1, wherein the electronic information path comprises:

a plurality of nodes along the roadway; and an information link connecting each of the plurality of nodes to an adjacent node.

6. The system of claim 1, wherein the state of the roadway includes a metric.

7. The system of claim 1, wherein the state of the roadway includes a transit time.

8. A method of operating an electronic nervous system for a roadway, comprising the steps of:

a) creating a plurality of symbolic patterns, one for each of a plurality of nodes along the roadway;

b) propagating the plurality of symbolic patterns along an electronic roadway; and c) calculating a state of the roadway by comparing two of the plurality of symbolic patterns.

9. The method of claim 8, wherein step (a) further includes the steps of:

a1) sensing a traffic pattern; and a2) deriving one of the plurality of symbolic patterns from the traffic pattern.

10. The method of claim 9, further including the step of sensing a roadway condition and deriving the one of the plurality of symbolic patterns from the traffic pattern and the roadway condition.

11. The method of claim 8, wherein step (b) further includes the step of:

b1) transferring each of the plurality of symbolic patterns from a creating node to an adjacent node.

12. The method of claim 8, wherein step (c) further includes the step of:

c1) determining a metric.

13. The method of claim 8, further including the step of:

c1) determining a trip time.

* * * * *